United States Patent [19]

Petrik et al.

[11] E Patent Number: Re. 31,908

[45] Reissued Date of Patent: Jun. 4, 1985

[54] GLOW PLUG

[75] Inventors: John T. Petrik, Newtown; Brooke N. Westover, Stratford, both of Conn.

[73] Assignee: Sun Chemical Corporation, New York, N.Y.

[21] Appl. No.: 579,441

[22] Filed: Feb. 13, 1984

Related U.S. Patent Documents

Reissue of:

[64] Patent No.: 4,414,463
Issued: Nov. 8, 1983
Appl. No.: 303,004
Filed: Sep. 17, 1981

[51] Int. Cl.[3] ..... F23Q 7/10

[52] U.S. Cl. ..... 219/270; 123/145 A; 219/267; 219/523; 219/541; 361/266; 338/302

[58] Field of Search ..... 123/145 A, 145 R; 219/260, 267, 270, 523, 541, 552; 361/264, 265; 338/302; 431/262, 263

[56] References Cited

U.S. PATENT DOCUMENTS

| | | | |
|---|---|---|---|
| 1,632,314 | 6/1927 | Rudqvist | 123/145 A |
| 2,019,836 | 11/1935 | Widmann | 123/145 A |
| 2,039,525 | 5/1936 | Edwards | 123/145 A |
| 2,140,943 | 12/1938 | Rudquist | 123/145 A |
| 2,404,841 | 7/1946 | Hess et al. | 219/270 X |
| 2,484,544 | 10/1949 | Bennett et al. | 219/270 |
| 3,749,980 | 7/1973 | Baxter | 219/267 X |
| 4,080,944 | 3/1978 | Bhat et al. | 123/145 A |
| 4,252,091 | 2/1981 | Steinke | 123/145 A |
| 4,260,872 | 4/1981 | Brodmann et al. | 219/270 |
| 4,283,703 | 8/1981 | Horwitt | 388/34 |
| 4,358,663 | 11/1982 | Sperner et al. | 219/270 |
| 4,437,440 | 3/1984 | Sato | 123/145 A |

FOREIGN PATENT DOCUMENTS

| | | | |
|---|---|---|---|
| 2634798 | 9/1978 | Fed. Rep. of Germany | 219/270 |
| 60520 | 4/1924 | Sweden | 123/145 A |
| 408917 | 4/1934 | United Kingdom | 123/145 A |
| 927336 | 5/1963 | United Kingdom | 123/145 A |

*Primary Examiner*—Volodymyr Y. Mayewsky
*Attorney, Agent, or Firm*—Cynthia Berlow

[57] ABSTRACT

A glow-plug [ignitor for diesel engines and the like,] comprising a tubular body having external screw threads and an adjoining hexagonal formation by which a tool such as a wrench can be applied to the body to screw it into [the] *a* threaded cavity [of a cylinder]. Next to the hexagonal formation is a spade lug connector for bringing current to the plug, the connector being so arranged as to permit the application of either a socket-type wrench or else a box-end wrench. The inner end of the body has an elongate projecting pin on which there is a tightly wound resistance coil that becomes incandescent when excited with the proper electric current. The valleys of the coil show higher temperatures, for a given heating current, due to the radiation and reception of radiated heat involving the opposed surfaces[; therefore, starts at lower engine temperatures are improved].

12 Claims, 16 Drawing Figures

GLOW PLUG

Matter enclosed in heavy brackets [ ] appears in the original patent but forms no part of this reissue specification; matter printed in italics indicates the additions made by reissue.

BACKGROUND

This invention relates to [glow-plug ignitors] *glow-plugs* for [diesel] engines, [and the like,] and more particularly to [ignitors] *plugs* of this type wherein a coil of resistance wire is electrically heated. [to effect the ignition of the fuel mixture in the engine cylinder.]

In the past various types of [diesel glow-plug ignitors] *glow-plugs* have been proposed and produced. Some involved heating coils which were enclosed in a metal sheath by which the coil wires were protected, the sheath becoming sufficiently incandescent to effect [ignition of the combustible mixture] *a desired result. Such* [glow plugs] *glow-plugs,* while operating satisfactorily to an extent, were not *always* sufficiently rapid in their responses. [, resulting in slow or difficult starting of the engine.]

Other types of [glow plugs] *glow-plugs* variously employed sheathed wires wherein perforations were provided in the sheathing for the purpose of improving the time response of the device while at the same time providing support and/or protection for the resistance wire. While the response time was improved to an extent, the heating was still much slower than that effected, for example, by [high-tension gap-type] *other type plugs.* [such as are used in gasoline and similar engines.]

Yet other [glow plugs] *glow-plugs* have been proposed, wherein the resistance wires were fully exposed so that their incandescent condition could be utilized to the greatest advantage in speeding up the time response characteristic. These represented a further improvement in the time response but of course there still existed the built-in time lag resulting from the mass of wire and its support as they responded to the heating effect of the energizing current. The spacing between adjoining convolutions of the heating coil represented nonproductive areas, insofar as the producing of heat of incandescence was concerned. [, and starts were often slow, with a cold engine.]

SUMMARY

The above drawbacks and disadvantages of prior [diesel glow-plug ignitors] *glow-plugs* are obviated by the present invention, which h as for one object the provision of a novel and improved resistance-type [ignitor plug] *glow-plug* wherein improved [starts are] *heating is* had [with a cold engine,] when given [a heating] *an exciting* current that is factory-determined to have no more than a predetermined maximum value.

Another object of the invention is to provide an improved [ignitor plug] *glow-plug* as above, wherein an extremely fast response to the current is had, thereby still further materially reducing or improving the time-response characteristic of the plug.

Still another object of the invention is to provide an improved [ignitor plug ] *glow-plug* in accordance with the foregoing, wherein higher igniting temperatures are obtained for a given heating current, without sacrificing long life.

Yet another object of the invention is to provide an improved glow-plug [ignitor] as above set forth, wherein the heating coil or element is especially rugged and resistant to deterioration and damage.

A still further object of the invention is to provide an improved glow-plug [ignitor] as above characterized, wherein the maximum utilization of the available space is had, in producing incandescence for the *desired* purpose. [of igniting the fuel mixture in an engine.]

A feature of the invention resides in the provision of an improved glow-plug [ignitor] in accordance with the foregoing, wherein reliable and effective connector means are provided for the electrical circuit, such connector means being so arranged as to enable a socket or box type wrench to be used for screwing in or unscrewing the plug if so desired.

Still another object of the invention is to provide an improved glow-type [ignitor] plug as detailed above, which is especially reliable in its operation and characterized by a relatively long, useful life.

Yet another feature of the invention resides in the provision of [an ignitor plug] *a glow-plug* of the kind outlined, which has relatively few parts, being especially simple in its construction, and which can be economically mass-produced by automatic or semi-automatic machinery and tooling.

In accomplishing the above objects the invention provides a tubular plug body of suitable metal such as steel, having external screw threads which are cooperable with mating threads in an opening of an engine. [cylinder.] Adjoining the screw threads is an hexagonal formation adapted to be engaged by a wrench, for screwing in or unscrewing the body. Adjoining the hexagonal formation is a spade connector which is welded to a core pin of metal, the connector being arranged to permit the use of a socket or box type wrench on the hexagonal formation. The core pin has an integral shoulder intermediate its ends and a projecting stem which constitutes a core on which latter a heavy tightly-wound resistance coil can be carried. One end of the coil is welded to the tip of the core pin and the other end is welded to a ribbed end portion of the plug body. The shouldered and core portions of the core pin are plasma coated to provide a heat-resistant insulation by which the pin is insulated from the body and from the coil convolutions. Within the body a ceramic sleeve is disposed, encircling the core pin, and ceramic cement permeates the areas adjoining the sleeve. The sleeve is applied after cement has first been injected in the proper area, whereby the sleeve functions as a ram to force the cement into all available spaces, including areas surrounding a roughened portion of the core pin. The hardening of the ceramic cement securely binds the core pin in place in the metal body.

The tightly-wound heating coil is characterized by an intercoil heating effect which results in the obtaining of higher temperatures at the valleys of the coil, using the same heating current. In consequence, improved [starts] *results* are had. [, especially when the engine is cold.]

The heating coil is preferably wound on an arbor after its one end has been first securely welded to the ridged or ribbed end portion of the plug body.

Still other features and advantages will hereafter appear.

In the accompanying drawings, illustrating one embodiment of the invention in enlarged scale:

Figure 1:
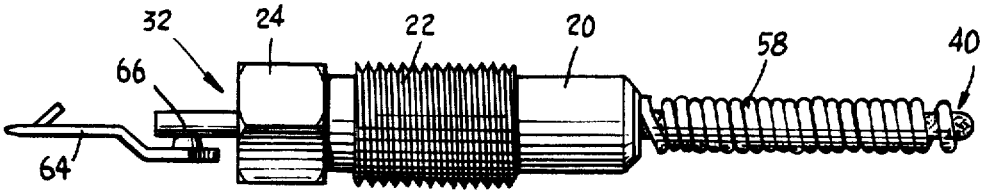
FIG. 1 is a side elevational view of [the] *an* improved [diesel glow plug ignitor] *glow-plug* as provided by the invention *having at its outer end an hexagonal head for a wrench.*
Figure 2:
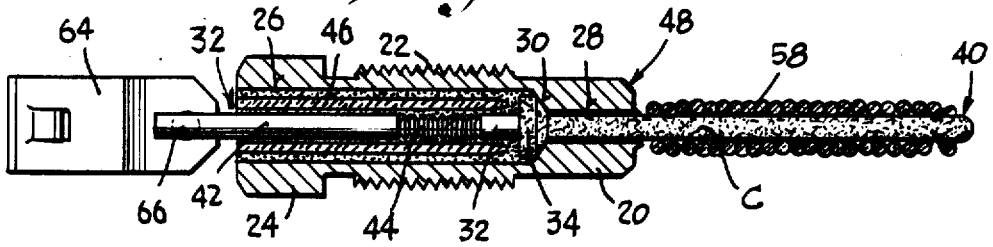
FIG. 2 is an axial sectional view of the [ignitor] *plug* of FIG. 1.
Figure 3:
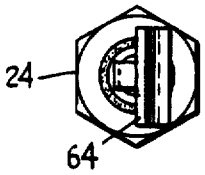
FIG. 3 is an end elevational view of the [*ignitor,*] *plug,* looking at the left *or outer* end as viewed in FIGS. 1 and 2.
Figure 4:
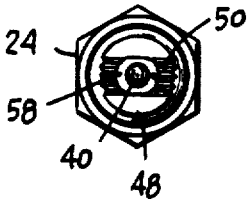
FIG. 4 is a right end *or inner end* elevational view of the [ignitor.] *plug.*
Figure 5:
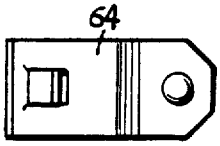
FIG. 5 is a plan view of the spade connector member *mounted on the outer end* of the [ignitor.] *plug.*

Referring first to FIGS. 1 and 2, the [ignitor] *plug* as provided by the invention comprises a tubular metal body *or tubular metal support structure* 20 having intermediate its inner *rightmost* and outer *leftmost* ends external screw threads 22 and at its outer end adjacent said threads *having* an hexagonal configuration 24 adapted for engagement by a wrench. The screw threads 22 are acceptable, *for example,* in the threaded ignitor plug openings of the cylinders of diese engines, as will be understood.

Figure 12:
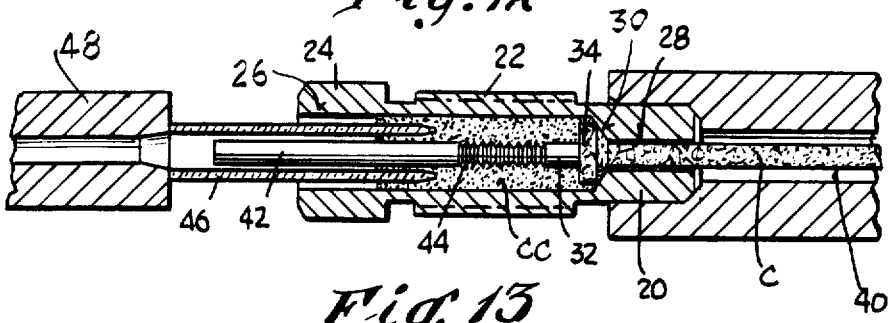
FIG. 12 is a fragmentary axial sectional view of the parts of the [ignitor,] *plug,* illustrating a step in the assembly thereof.
Figure 13:
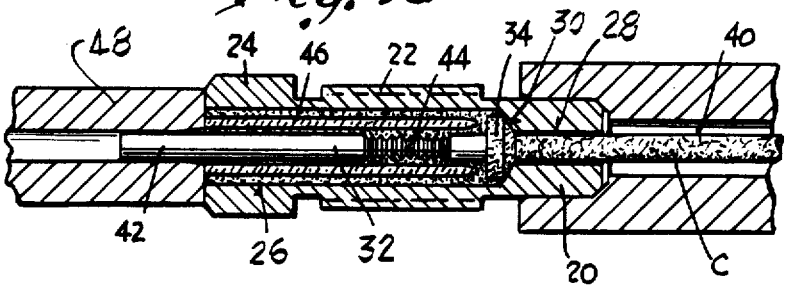
FIG. 13 is a view like that of FIG. 12, illustrating a further step in the assembly.
Figure 14:
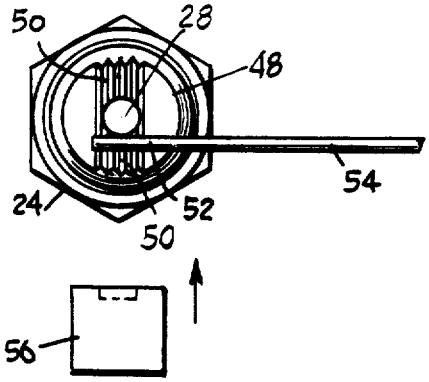
FIG. 14 is an end elevational view of the [ignitor] *plug* body, illustrating the step of welding [one] *the outer end of the heater coil* [thereto] *to the inner end of the plug body*.

As seen in FIGS. 2, 12 and 13, the bore of the body 20 is stepped, that is, it has a large-diameter bore 26 and a smaller-diameter bore 28 which are separated by an internal annular or conical shoulder 30.

The body 20 nominally can be constituted of steel, with suitable surface treatment such as plating.

Disposed within and insulated from the body 20 is an *elongate electrically conductive member, or* electrically conductive core pin 32, see FIGS. 1, 2, 12 and 13, which is preferably made from stainless steel. The core pin 32 comprises an elongate straight shank having intermediate its ends an integral annular shoulder 34 with one flat circular face 36 and an opposite conical face 38.

Figure 7:
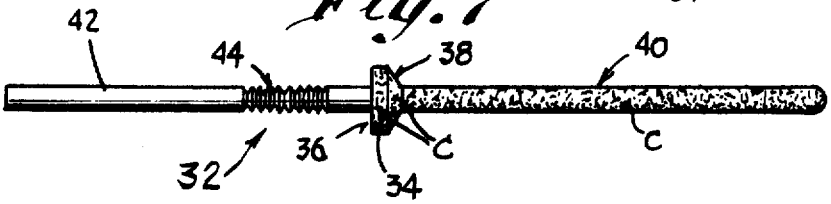
FIG. 7 is a side elevational view of the core pin per se, as [it has] *the projecting portion and free end thereof have* been plasma coated with the heat-resistant insulating layer.
Figure 8:
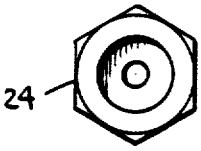
FIG. 8 is an elevational view of [one] *the outer* end of the body of the [ignitor.] *plug.*
Figure 9:
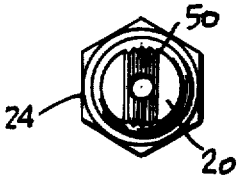
FIG. 9 is an elevational view of the [other] *inner* end of the body of the [ignitor.] *plug.*
Figure 11:
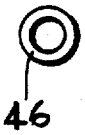
FIG. 11 is an end elevational view of the ceramic sleeve of FIG. 10.

As provided by the invention, the core pin 32 has areas or *projecting* portions of it insulated by a plasma-sprayed ceramic coating, as seen in FIG. 7. This coating is designated "C", and is applied especially to the *projecting* shank [portion or inner end] *or coil support* portion 40 and the shoulder 34; optionally it can be omitted from the flat circular surface 36 of the shoulder 34.

The core pin 32 has a smooth *support* shank portion 42 which is provided with a roughened area 44 that can be advantageously in the form of a series of annular grooves.

The positioning of the core pin 32 in the body 20 is effected by engagement between the coated shoulder 34 of the pin and the internal annular shoulder 30 of the body 20, and as thus located the pin 32 will be insulated from the body 20 by the plasma-sprayed ceramic coating "C".

Figure 10:
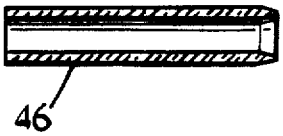
FIG. 10 is an axial sectional view of a ceramic sleeve insulator of the [ignitor.] *plug.*

According to the invention, prior to the positioning of the pin 32 in the body 20, a quantity of slurry of ceramic cement "CC" is injected in the space within the walls of the large body bore 26. Then the pin 32 is pushed into the body until the shoulder 34 of the pin engages the shoulder 30 of the body. Now additional ceramic cement slurry is injected in the space between the walls of the bore 26 and the smooth shank portion 42 [(also referred to as a second projecting portion)] of the core pin 32, and thereafter a ceramic sleeve 46 is pushed into the injected cement "CC", and propelled to an intervening position (FIG. 13) by a plunger 48. This assembly is illustrated in FIGS. 12 and 13, wherein the sleeve 46 is seen to act as a ram, forcing the cement "CC" into all spaces, crevices or interstices, so that it completely eliminates air pockets and also permeates and forms an interlock with the roughened area 44 of the pin, [when it has hardened] *and such that the cement is forcibly engaged with the sleeve.* The ceramic cement "CC" by its engagement with the shoulder 34 of the core pin securely and rigidly positions the pin in the body 20, in insulated relation therewith, such that the pin and body are physically structurally united. As shown in FIGS. 2 and 10, one end of the sleeve 46, the right-hand end in FIG. 10, has a reduced wall thickness with respect to its remainder, to provide a lead-in which facilitates its insertion, as in FIGS. 12 and 13.

Figure 15:
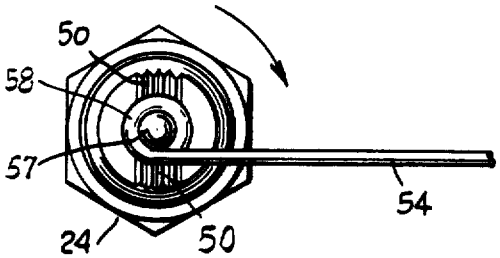
FIG. 15 is a view like that of FIG. 14 but illustrating the step of winding of the coil.
Figure 16:
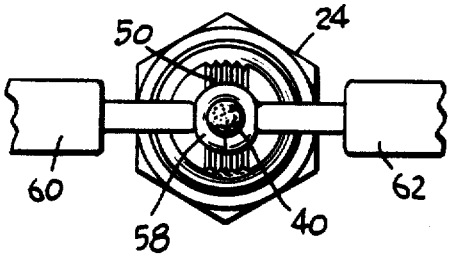
FIG. 16 is a view like that of FIG. 15 but illustrating the step of welding the other *or inner* end of the coil to the *free end of the* core pin.

As provided by the invention, referring to FIGS. 9 and 14–16, the inner *or* end face 48 of the body 20 is formed with a plurality of ribs or ridges 50, and [one] *the outer* end 52 of a resistance wire or heater wire 54 is welded to the end face, as by the use of a suitable welding electrode 56. This is preferably done prior to the attachment of the core pin 32 to the body in the manner set forth above, and also the heating coil of the [ignitor] *plug* is preferably wound before placement of the core pin. In accomplishing this, the heating coil wire 54 which is attached to the body 20 is tight-wound about a mandrel 57 as seen in FIG. 15. It is seen in FIG. 1 that the wire 54 is tightly and closely coiled to form a helical heater or igniting coil 58. The wire 54 is bare, and the convolutions are made to touch each other during the winding. It can be noted here that during the later initial energization of the coil 58 an oxide coating forms on the surfaces and insulates adjoining convolutions from each other to prevent adjacent turns from short-circuiting each other.

After winding is completed, the mandrel 57 and coil 58 with the body 20 are separated, whereupon the core pin 32 is assembled to the body in the manner explained above. Then the free end *or inner* end convolution of the coil is cross-welded to the *free* (*inner* tip *or end* of the core pin by the use of opposed electrodes 60, 62 as seen in FG. 16 [.] , *the weld and ribs 50 constituting a con-*

*ductor means, or a means for making electrical connection to the outer end of the coil 58.*

The provision of the parallel ridges 50 on the inner end face 48 of the body 20 can be easily done; it results in a secure and effective weld of the *outer end of the* coil to the *inner end of the* body, and one which will withstand considerable use and vibration without failure. Likewise, the cross welding of the last, *inner end of* end convolution of the coil 58 to the *free end of the* core pin 32 results in a very secure, failure-resistant connection. Accordingly, [one] *the outer* end of the coil 58 is *obviously* at substantially the same electrical potential as the body 20, and the [other] *inner* end *of the coil 58* is at substantially the same electrical potential as the core *free end of the* pin 32.

The tight-wind of the coil 58 is of great advantage in producing a high heat density in a very small space, according to the invention, and this gives very quick heating, and improved, more rapid starts *where the plug is used in the cylinder* of [the] *a* diesel engine. Surface temperatures in the valleys of the coil are much hotter than at the coil crests, due to the heat radiation striking the opposite surfaces in the valleys. Thus, higher temperatures are attained for a given, maximum specified value of heating current. This results in faster starts at lower engine temperatures. At the same time, the coil construction is mutually supportive and especially resistant to vibration and failure. The convolutions of the coil do not short-circuit to the projecting portion of the core pin 32 due to the plasma sprayed insulating coating thereon.

The invention further provides an advantageous connector structure by which current can be brought to the core pin 32 while at the same time there is avoided interference with socket or box end wrenches that are to be applied to the hexagonal portion 24 of the body 20.

Figure 6:
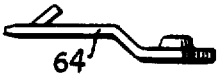
FIG. 6 is an edge view of the spade connector member.

As seen in FIGS. 1, 2 and 6, a spade terminal 64 is welded to the outer end 66 of the core pin 32, such terminal being located within the confines of the theoretical hexagonal shell which would be obtained if the six sides of the hexagonal portion 24 were to be extended to the left as viewed in FIGS. 1 and 2. Thus a socket or box end wrench for the portion 24 can be easily applied over the terminal 64 to screw in, or unscrew the body 20.

It will now be seen from the foregoing that we have provided a novel and improved [diesel engine plug ignitor] *glow-plug* which is especially efficient in the use of the heating current, quick-acting, simple and economical to fabricate, convenient in its use, and capable of reliable operation over an extended period of time.

Variations and modifications are possible without departing from the spirit of the claims.

We claim:

1. A diesel glow-plug ignitor comprising, in combination:

(a) a tubular metal body having an inner end securely carried in a cylinder opening of an engine, (b) an electrically conductive core pin insulatedly carried in the bore of the body, physically structurally united therewith, and having a portion projecting from said inner end thereof, said projecting portion of said core pin being coated with insulating material, and (c) a tight-wound helical igniting coil of resistance wire on said projecting portion of the core pin, having its ends respectively welded to the body and welded substantially to the end of said projecting portion of the pin, (d) the convolutions of said coil having an insulating oxide coating thereon to prevent them from short-circuiting each other, (e) said insulating material on the core pin having ceramic-containing insulation and being plasma sprayed thereon to further prevent the convolutions of the coil from electrically contacting the projecting portion of the core pin.

2. The invention as defined in claim 1, wherein:

(a) the inner end of the metal body has a plurality of ridges to which the one end of the coil is welded.

3. The invention as defined in claim 1, wherein:

(a) an end convolution of the coil is welded at diametrically opposite spots to the core pin.

4. A diesel glow-plug ignitor as defined in claim 1, wherein:

(a) said tubular metal body has an hexagonal configuration at one end, to enable it to have a wrench applied to it for installing it in said cylinder, (b) said core pin having an additional portion projecting from the hexagonal configuration of the body and being externally exposed, and (c) a spade terminal carried by and welded to the side of the additional portion of the core pin, (d) said spade terminal being so located and having a small enough dimension so as to facilitate installation of a cup-type socket wrench of similar hexagonal configuration which is intended to be applied to said hexagonal configuration of the body past the spade terminal.

5. A diesel glow-plug ignitor comprising, in combination:

(a) a tubular metal body having an inner end securely carried in a cylinder opening of an engine, (b) an electrically conductive core pin insulatedly carried in the bore of the body and extending through the bore of the body, physically structurally united therewith and having a portion projecting from the inner end thereof, (c) an insulating sleeve disposed within and in spaced relation to the metal body and surrounding said core pin and spaced therefrom, (d) a helical igniting coil of resistance wire on the projecting portion of the core pin and being electrically insulated therefrom, said coil having its ends respectively electrically connected to the body and electrically connected substantially to the end of said projecting portion of the pin, and (e) ceramic cement disposed in the spaces between the body, core pin and sleeve.

6. The invention as defined in claim 5, wherein:

(a) the core pin has a shoulder intermediate its ends, (b) said body having an internal cooperable annular shoulder engaged with the shoulder of the core pin to position the latter.

7. The invention as defined in claim 6, wherein:

(a) the shoulder of the core pin has a plasma-sprayed coating of insulation.

*8. A heater plug for use with an internal combustion engine, comprising, in combination:*

*(a) a tubular metal support structure having an outer end and an inner end,*

*(b) an electrically conductive core pin insulatedly carried in the bore of the support structure, physically structurally united therewith, and having a coil-supporting projecting portion terminating in a free end, said pro-*

*jecting portion being coated with insulating material, and*

*(c) a helical heater coil of resistance wire on said projecting portion of the core pin, said coil having an outer end welded to the inner end of the support structure and having an inner end welded to the free end of the projecting portion of the core pin,*

*(d) the convolutions of said heater coil being closely spaced and having an insulating oxide coating thereon to prevent them from short-circuiting each other,*

*(e) said insulating material on the core pin comprising ceramic-containing insulation which is plasma sprayed thereon to further prevent the convolutions of the coil from electrically contacting the said projecting portion of the core pin.*

*9. The invention as defined in claim 8, wherein:*

*(a) the inner end of the support structure has a plurality of ridges to which the outer end of the heater coil is welded.*

*10. The invention as defined in claim 8, wherein:*

*(a) the innermost convolution of the heater coil is welded at diametrically opposite spots to the free end of the core pin.*

*11. A heater plug for use with an internal combustion engine, comprising, in combination:*

*(a) a tubular metal body having an inner end adapted to be carried in a supporting opening,*

*(b) an elongate electrically conductive member having a plasma-sprayed insulating coating thereon and insulatedly carried in the bore of the body and extending through said bore, said member being physically structurally united therewith and having a coil-supporting projecting portion terminating in a free end,*

*(c) an insulating sleeve disposed within and in spaced relation to the metal body and surrounding said elongate conductive member in spaced relation thereto,*

*(d) a helical coil of resistance wire mounted on said projecting portion of the elongate member and insulated therefrom by said plasma-sprayed coating, said coil having its outer end electrically connected to the inner end of the tubular metal body and having its inner end welded to said free end of the projecting portion, and*

*(e) ceramic cement disposed in the space between the tubular body and the insulating sleeve and in the space between the insulating sleeve and the elongate conductive member, said cement being forcibly engaged with the inner and outer surfaces of the insulating sleeve under pressure.*

*12. A heater plug for use with an internal combustion engine, comprising, in combination:*

*(a) a tubular metal body having an inner end adapted to be carried in a supporting opening,*

*(b) an electrically conductive core pin having a plasma-sprayed insulating coating thereon and insulatedly mounted in the bore of the body and extending therethrough, said core pin being physically structurally united with the tubular metal body and having a coil-supporting projecting portion terminating in a free end,*

*(c) an insulating ceramic sleeve of generally tubular configuration, disposed within and in spaced relation to the tubular metal body and surrounding said core pin and being spaced therefrom,*

*(d) a helical coil of resistance wire on the projecting portion of the core pin and having its intermediate convolutions insulated therefrom by said plasma-sprayed insulating coating, said coil having its inner end electrically connected to said free end of the core pin and having its outer end welded to the inner end of the tubular metal body, and*

*(e) ceramic cement disposed in the space between the tubular metal body and the ceramic sleeve, and in the space between the ceramic sleeve and the core pin, said cement being forcibly engaged with the inner and outer surfaces of the sleeve under pressure.*

* * * * *